United States Patent
Mundt et al.

(10) Patent No.: US 10,805,112 B2
(45) Date of Patent: Oct. 13, 2020

(54) SYSTEM AND METHOD OF ESTABLISHING COMMUNICATIONS WITH MULTIPLE INFORMATION HANDLING SYSTEMS

(71) Applicant: Dell Product L.P., Round Rock, TX (US)

(72) Inventors: Kevin Warren Mundt, Austin, TX (US); Jon Robert Hass, Austin, TX (US); Juan R. Vega, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 16/299,540

(22) Filed: Mar. 12, 2019

(65) Prior Publication Data

US 2020/0295968 A1  Sep. 17, 2020

(51) Int. Cl.
*H04L 12/46* (2006.01)
*H04L 29/06* (2006.01)

(52) U.S. Cl.
CPC ...... *H04L 12/4633* (2013.01); *H04L 12/4641* (2013.01); *H04L 63/08* (2013.01); *H04L 63/10* (2013.01); *H04L 63/20* (2013.01)

(58) Field of Classification Search
CPC . H04L 12/4633; H04L 12/4641; H04L 63/08; H04L 63/10; H04L 63/20
See application file for complete search history.

(56) References Cited

U.S. PATENT DOCUMENTS

| 5,295,258 A | 3/1994 | Jewett et al. |
| 5,857,074 A | 1/1999 | Johnson |
| 5,892,928 A | 4/1999 | Wallach et al. |
| 5,905,867 A | 5/1999 | Giorgio |

OTHER PUBLICATIONS

Redfish Scalable Platforms Management API Specification, Distributed Management Task Force, Inc., Version 1.6.1, Dec. 13, 2018, DSP0266; 133 pages.
Redfish Interoperability Profiles, Distributed Management Task Force, Inc., Version 1.0.1, May 15, 2018, DSP0272; 24 pages.
(Continued)

*Primary Examiner* — Minh Chau Nguyen
(74) *Attorney, Agent, or Firm* — Baker Botts L.L.P.

(57) ABSTRACT

In one or more embodiments, one or more systems, methods, and/or processes may receive, via a network, multiple subscription requests from respective multiple baseboard management controllers (BMCs) of respective multiple information handling systems (IHSs); may receive, via the network, authentication information from a first information handling system (IHS), different from each of the multiple IHSs; may determine that the first IHS is authenticated to access the multiple BMCs; may receive, via the network, multiple publication requests from the first IHS to access, via the network, the multiple BMCs respectively; may receive, via the network, multiple queries from the multiple BMCs respectively associated with the multiple subscription requests; may determine that the multiple publication requests are associated with the multiple subscription requests and are associated with the multiple queries associated with the multiple subscription requests; and may establish network communications with the first IHS and the multiple BMCs.

20 Claims, 5 Drawing Sheets

(56) References Cited

OTHER PUBLICATIONS

Redfish Host Interface Specification, Distributed Management Task Force, Inc., Version 1.0.1, Dec. 11, 2017, DSP0270; 19 pages.
Redfish—Simple and Secure Management for Converged, Hybrid IT, Technical Notes, Distributed Management Task Force, Inc., Nov. 2018; 4 pages.
Autor, Jeff. Introduction to Redfish. DMTF Scalable Platforms Management Forum, May 2015; 13 pages.
Management Component Transport Protocol (MCTP) SMBus/I2C Transport Binding Specification, Distributed Management Task Force, Inc., Version 1.1.0, May 21, 2017; 36 pages.
Management Component Transport Protocol (MCTP) Base Specification, Includes MCTP Control Specifications, Distributed Management Task Force, Inc., Version 1.3.0, Nov. 24, 2016; 94 pages.
Management Component Transport Protocol (MCTP) Overview, Distributed Management Task Force, Inc., Version 1.0.0a, Jul. 2007, DSP2016; 15 pages.
Compaq ProLiant 7000 Server Technology, Technology Brief, Second Edition, Jun. 1998; 23 pages.
Intelligent Platform Management Bus Communications Protocol Specification, v1.0, Intel Hewlett-Packard NEC Dell, Nov. 15, 1999; 40 pages.
Zhuo, Haihong, Jianwen Yin, and Anil V. Rao. "Remote management with the baseboard management controller in eighth-generation Dell Poweredge servers." *Magazine of Dell Power Solutions* (2004): 26-29; 4 pages.
Intelligent Platform Management Interface Specification, v2.0, Intel Hewlett-Packard NEC Dell, Oct. 1, 2013; 644 pages.
Eliminating Single Points of Failure and Enabling Rapid Recovery in Server Subsystems, Technology Brief, Compaq Computer Corporation, Nov. 1997; 13 pages.
Rekhter, Yakov, et al. *Address allocation for private internets*. No. RFC 1918. 1996; 9 pages.
Cheshire, Stuart, et al. *Understanding apple's back to my mac (BTMM) service*. No. RFC 6281. 2011; 16 pages.
Fleishman, G. (Nov. 7, 2007). Back to My Mac: Apple's Internet mashup. Retrieved from https://www.macworld.com/article/1060946/backtomymac_side.html; 3 pages.
Remote Server Management Integrated Remote Console, Compaq.com, First Edition, Oct. 1996; 7 pages.

SYSTEM AND METHOD OF ESTABLISHING COMMUNICATIONS WITH MULTIPLE INFORMATION HANDLING SYSTEMS

BACKGROUND

Field of the Disclosure

This disclosure relates generally to information handling systems and more particularly to establishing network communications with multiple information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive, via a network, multiple subscription requests from respective multiple baseboard management controllers of respective multiple information handling systems; may receive, via the network, authentication information from a first information handling system, different from each of the multiple information handling systems; may determine, based at least on the authentication information, that the first information handling system is authenticated to access the multiple baseboard management controllers; may receive, via the network, multiple publication requests from the first information handling system to access, via the network, the multiple baseboard management controllers respectively; may receive, via the network, multiple queries from the multiple baseboard management controllers respectively associated with the multiple subscription requests; determine that the multiple publication requests are associated with the multiple subscription requests and are associated with the multiple queries associated with the multiple subscription requests; may establish network communications with the first information handling system and the multiple baseboard management controllers; may provide, via the network, first information to the first information handling system to establish the network communications with the multiple baseboard management controllers; and may provide, via the network, second information to the multiple baseboard management controllers to establish the network communications with the first information handling system.

In one or more embodiments, establishing the network communications with the first information handling system and the multiple baseboard management controllers may be performed in response to determining that the multiple publication requests are associated with the multiple subscription requests and are associated with the multiple queries associated with the multiple subscription requests. In one or more embodiments, establishing the network communications with the first information handling system and the multiple baseboard management controllers may be performed via providing, via the network, the first information to the first information handling system to establish the network communications with the multiple baseboard management controllers; and providing, via the network, the second information to the multiple baseboard management controllers to establish the network communications with the first information handling system.

In one or more embodiments, receiving, via the network, the multiple subscription requests may include receiving first multiple message queuing telemetry transport (MQTT) messages, Apache ActiveMQ messages, Amazon SQS messages, IBM Websphere MQ messages, RabbitMQ messages, or RocketMQ messages, among others. In one or more embodiments, receiving, via the network, the multiple publication requests may include receiving second multiple MQTT messages, Apache ActiveMQ messages, Amazon SQS messages, IBM Websphere MQ messages, RabbitMQ messages, or RocketMQ messages, among others. In one or more embodiments, receiving, via the network, the multiple queries from the multiple baseboard management controllers respectively associated with the multiple subscription requests may include receiving third multiple MQTT messages, Apache ActiveMQ messages, Amazon SQS messages, IBM Websphere MQ messages, RabbitMQ messages, or RocketMQ messages, among others.

In one or more embodiments, the second information may include an indication of at least one tunneling protocol. For example, the at least one tunneling protocol may include at least one of an IP in IP (IPIP), a generic routing encapsulation (GRE), a secure socket tunneling protocol (SSTP), an Internet protocol security (IPSec), a layer 2 tunneling protocol (L2TP), a virtual extensible local area network (VXLAN), a virtual private network (VPN), a transport layer security (TLS), a secure socket layer (SSL), a secure shell (SSH) tunnel protocol, and a port forwarding protocol, among others.

In one or more embodiments, the one or more systems, methods, and/or processes may further receive, via the network, the indication of the at least one tunneling protocol from the first information handling system. In one or more embodiments, the one or more systems, methods, and/or processes may further receive, via the network, at least one Internet protocol (IP) address associated with the first information handling system. For example, the second information may include the at least one IP address. In one or more embodiments, the one or more systems, methods, and/or processes may further receive, via the network, first data from each of the multiple baseboard management controllers. In one or more embodiments, the one or more systems, methods, and/or processes may further provide, via the network, the first data from each of the multiple baseboard management controllers to the first information handling system. In one or more embodiments, the one or more systems, methods, and/or processes may further receive, via the network, second data from the first information handling system. In one or more embodiments, the one or more systems, methods, and/or processes may further provide, via the network, the second data to at least one of the multiple baseboard management controllers.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
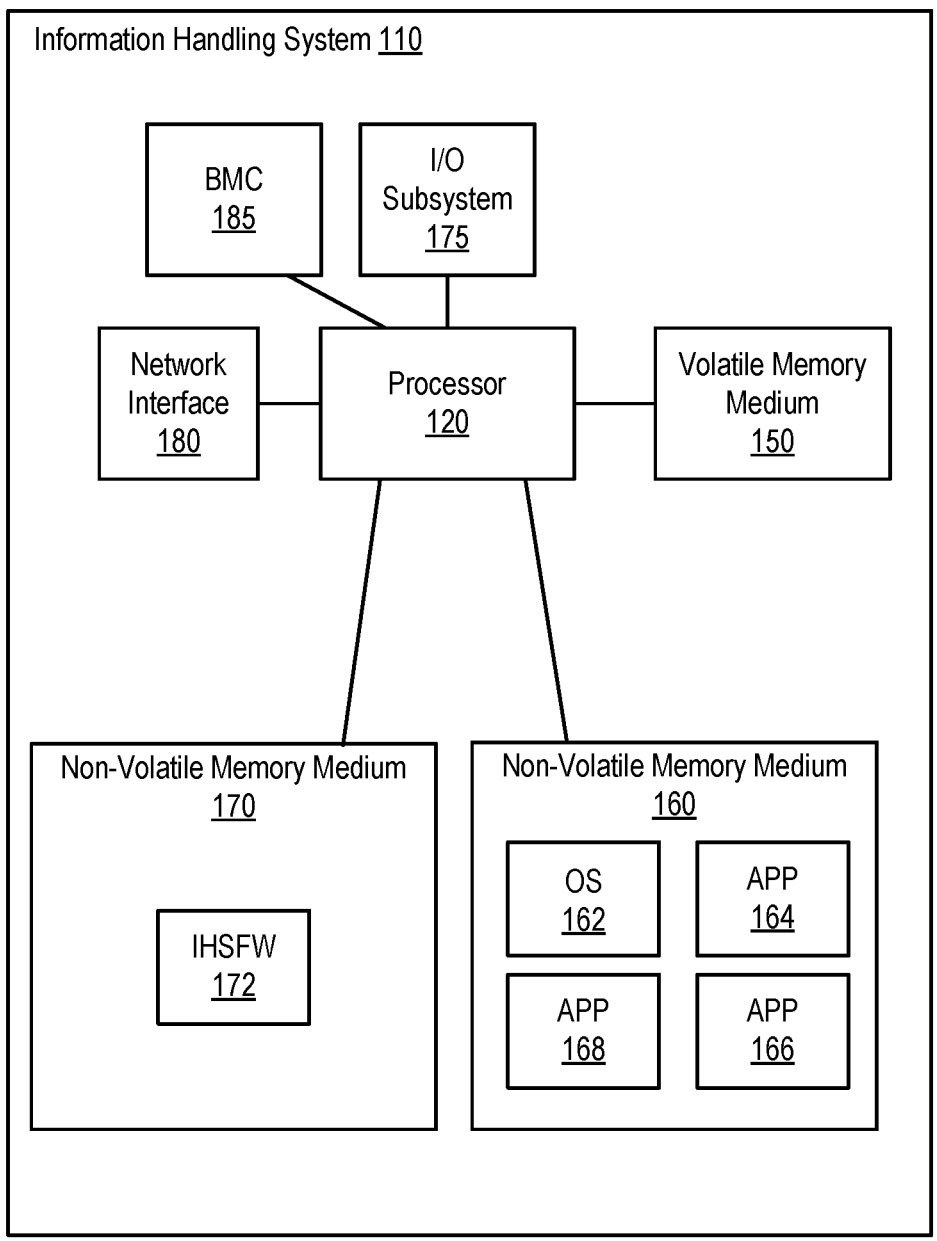
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may not be located in a data center. For example, the information handling system may be located on a customer premise. For instance, the information handling system may be or include customer premise equipment (CPE). In one or more embodiments, an entity may own the information handling system. In one or more embodiments, the entity may lease the information handling system. In one or more embodiments, the entity may utilize a first service that may manage the information handling system. In one or more embodiments, the entity may utilize a second service that may manage communications associated with the information handling system. For example, the second service may include one or more networking services. For instance, the second service may include an internet service provider. In one or more embodiments, the entity may utilize a third service that may manage one or more devices of CPE. For example, the third service may manage one or more network switches, one or more firewalls, and/or one or more network routers of and/or associated with the CPE. In one or more embodiments, the second service may include the third service.

In one or more embodiments, an administrator (e.g., a person) of one or more information handling systems may not be at a physical location of the one or more information handling systems. For example, the administrator may manage the one or more information handling systems remotely. For instance, the administrator may manage the one or more information handling systems remotely via a network. In one or more embodiments, each information handling system of the one or more information handling systems may include a remote access controller. For example, the administrator may manage the one or more information handling systems remotely via respective one or more remote access controllers.

In one or more embodiments, one or more network switches, one or more firewalls, and/or one or more network routers may be configured to permit the administrator to manage the one or more information handling systems remotely via respective one or more remote access controllers and/or via a network. In one example, the one or more network switches may be configured such that one or more ports of the one or more network switches are opened to permit the administrator to manage the one or more information handling systems remotely via the respective one or more remote access controllers and/or via the network. In a second example, the one or more firewalls may be configured such that one or more holes of the one or more firewalls are opened to permit the administrator to manage the one or more information handling systems remotely via the respective one or more remote access controllers and/or via the network. In another example, the one or more routers may be configured such that one or more ports of the one or more routers are opened to permit the administrator to manage the one or more information handling systems remotely via the respective one or more remote access controllers and/or via the network. In one or more embodiments, configuring the one or more network switches, the one or more firewalls, and/or the one or more network routers to permit the administrator to manage the one or more information handling systems remotely via the respective one or more remote access controllers and/or via the network may include configuring the one or more network switches, the one or more firewalls, and/or the one or more network routers to permit an information handling system associated with the administrator to initiate network communications.

In one or more embodiments, an entity associated with the one or more information handling systems and/or the administrator may not be able to configure the one or more network switches, one or more firewalls, and/or one or more network routers may be configured to permit the administrator to manage the one or more information handling systems remotely via the respective one or more remote access controllers and/or via the network. For example, a service provider may control and/or configure the one or more network switches, the one or more firewalls, and/or the one or more network routers. In one example, the service provider may not permit one or more ports and/or one or more holes to be opened to permit the administrator to manage the one or more information handling systems remotely via the respective one or more remote access controllers and/or via the network. In another example, an amount of time may transpire before the service provider may configure the one or more network switches, the one or more firewalls, and/or the one or more network routers to permit the administrator to manage the one or more information handling systems remotely via the respective one or more remote access controllers and/or via the network. In one instance, the one or more information handling systems may be inoperable while the amount of time transpires. In another instance, the one or more information handling systems may be at risk of a security breach while the amount of time transpires.

In one or more embodiments, opening one or more ports of the one or more network switches and/or opening one or more ports of the one or more network routers may introduce one or more security risks. In one or more embodiments, opening one or more holes in the one or more firewalls may introduce one or more security risks. In one or more embodiments, an intermediary information handling system may be utilized in managing the one or more information handling systems remotely via the respective one or more remote access controllers and/or via the network. In one example, the intermediary information handling system may receive a network connection from the information handling system associated with the administrator. In another example, the intermediary information handling system may receive a network connection from the one or more information handling systems.

In one or more embodiments, the intermediary information handling system may be utilized in establishing network communications between the information handling system associated with the administrator and the one or more information handling systems. For example, the intermediary information handling system may be utilized in establishing network communications between or among the information handling system associated with the administrator and the respective one or more remote access controllers of the one or more information handling systems. In one instance, the network communications between or among the information handling system associated with the administrator and the one or more information handling systems may include one or more virtual private networks (VPNs). In a second instance, the network communications between or among the information handling system associated with the administrator and the one or more information handling systems may include network socket connections. In a third instance, the network communications between or among the information handling system associated with the administrator and the one or more information handling systems may include network secure socket connections.

In one or more embodiments, utilizing the intermediary information handling system may permit and/or enable the network communications between or among the information handling system associated with the administrator and the one or more information handling systems without configuring the one or more ports of the one or more network switches to be opened to permit the administrator to manage the one or more information handling systems remotely via the respective one or more remote access controllers and/or via the network. In one or more embodiments, utilizing the intermediary information handling system may permit and/or enable the network communications between or among the information handling system associated with the administrator and the one or more information handling systems without configuring the one or more ports of the one or more network routers to be opened to permit the administrator to manage the one or more information handling systems remotely via the respective one or more remote access controllers and/or via the network. In one or more embodiments, utilizing the intermediary information handling system may permit and/or enable the network communications between or among the information handling system associated with the administrator and the one or more information handling systems without configuring the one or more firewalls to open one or more holes to permit the administrator to manage the one or more information handling systems remotely via the respective one or more remote access controllers and/or via the network.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162. In one or more embodiments, the management information exchange may utilize a Redfish standard application programming interface (API), available from the Distributed Management Task Force (DMTF). For example, one or more portions of the management information exchange may be compliant with one or more portions of a Redfish standard. For instance, one or more portions of the management information exchange may implement with one or more portions of a Redfish standard.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M02, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor. In one or more embodiments, BMC 185 may be or include one or more of a field programmable gate array (FPGA) and an ASIC, among others, configured, coded, and/or encoded with instructions in accordance with at least a portions of one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2:
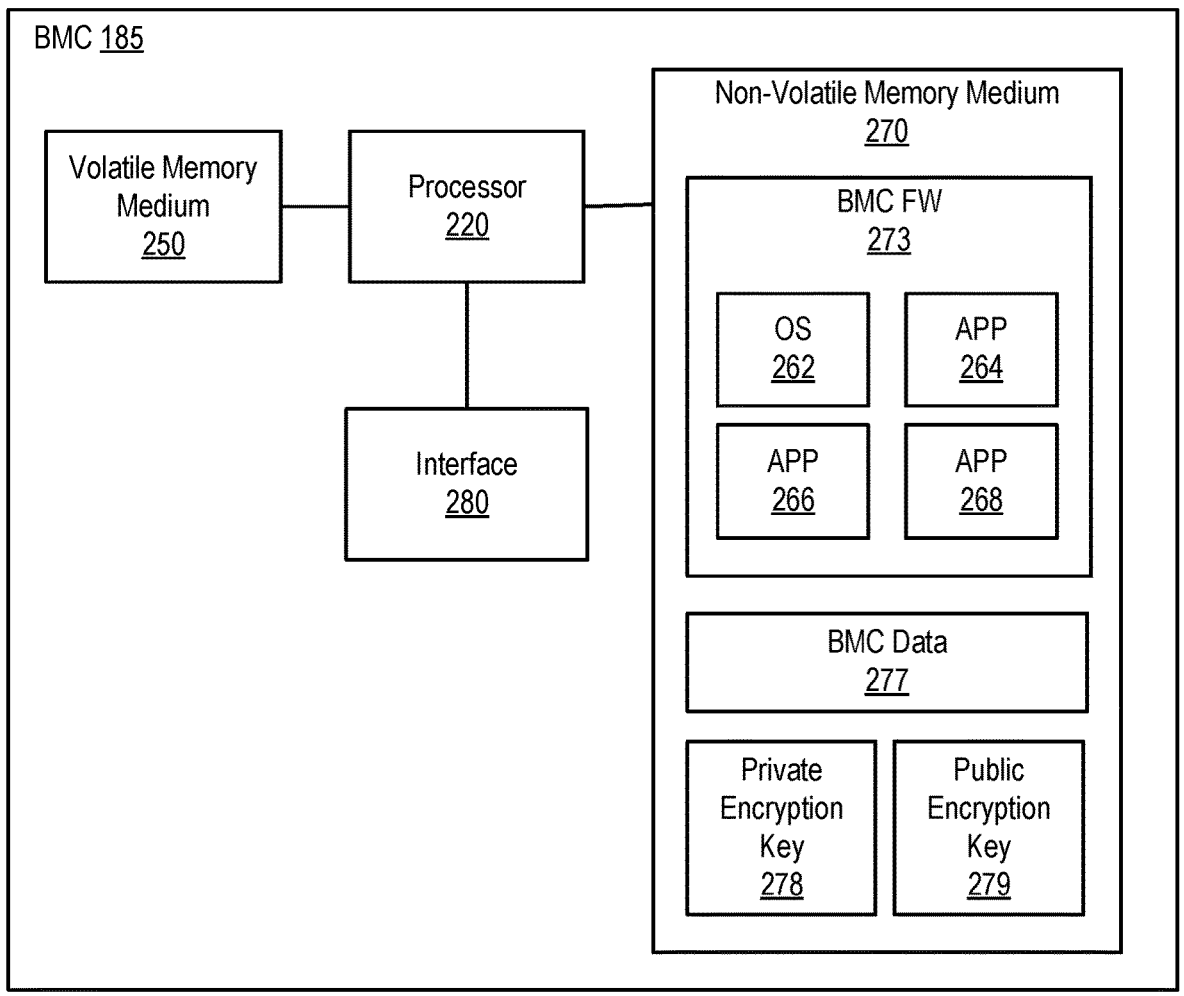
FIG. 2 illustrates an example of a baseboard management controller, according to one or more embodiments.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 and public encryption key 279 may be asymmetric encryption keys.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 260 may store instructions that may be executable in accordance with at least a portions of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
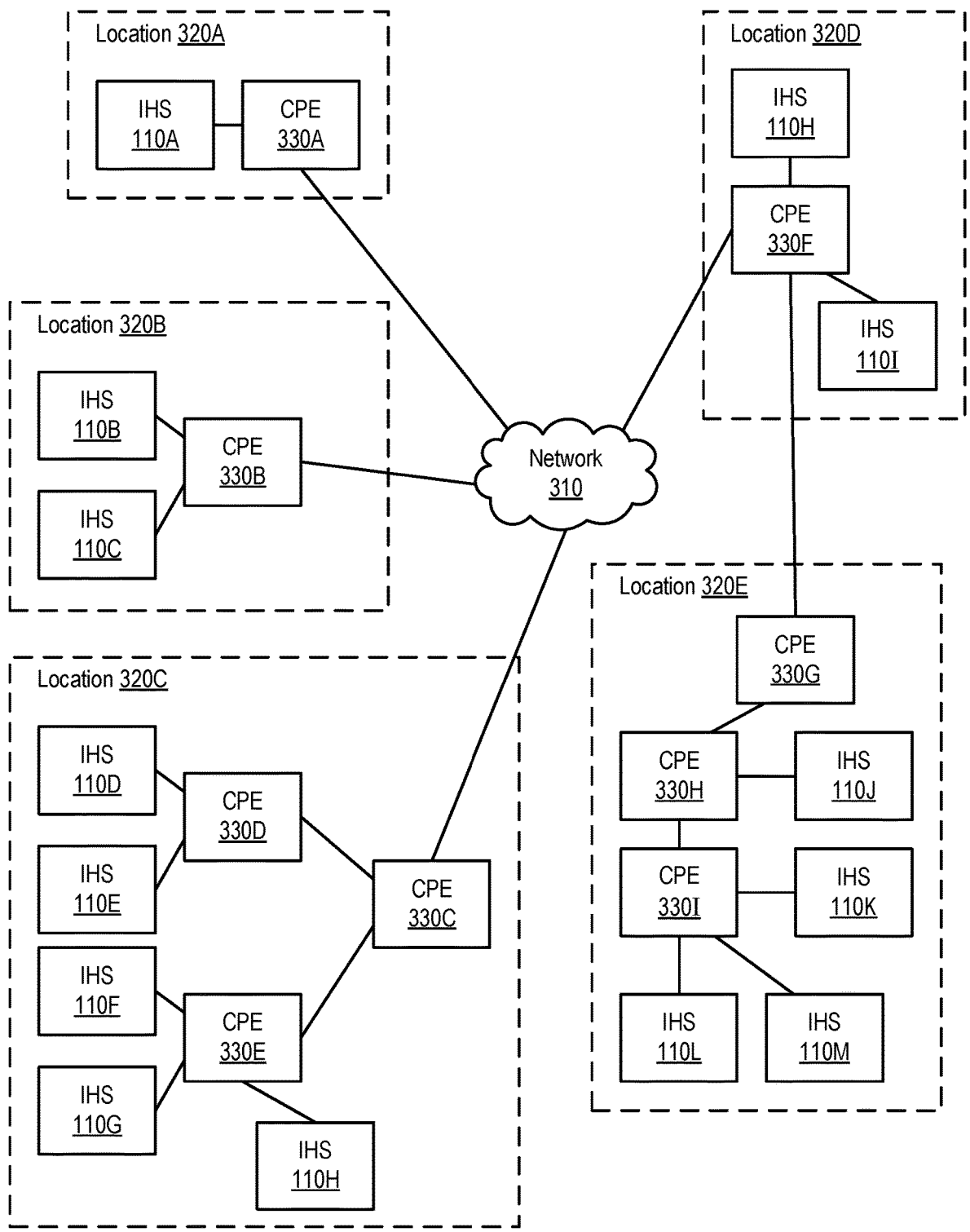
FIGS. 3A and 3B illustrate examples of information handling system coupled to a network, according to one or more embodiments.
Figure 3B:
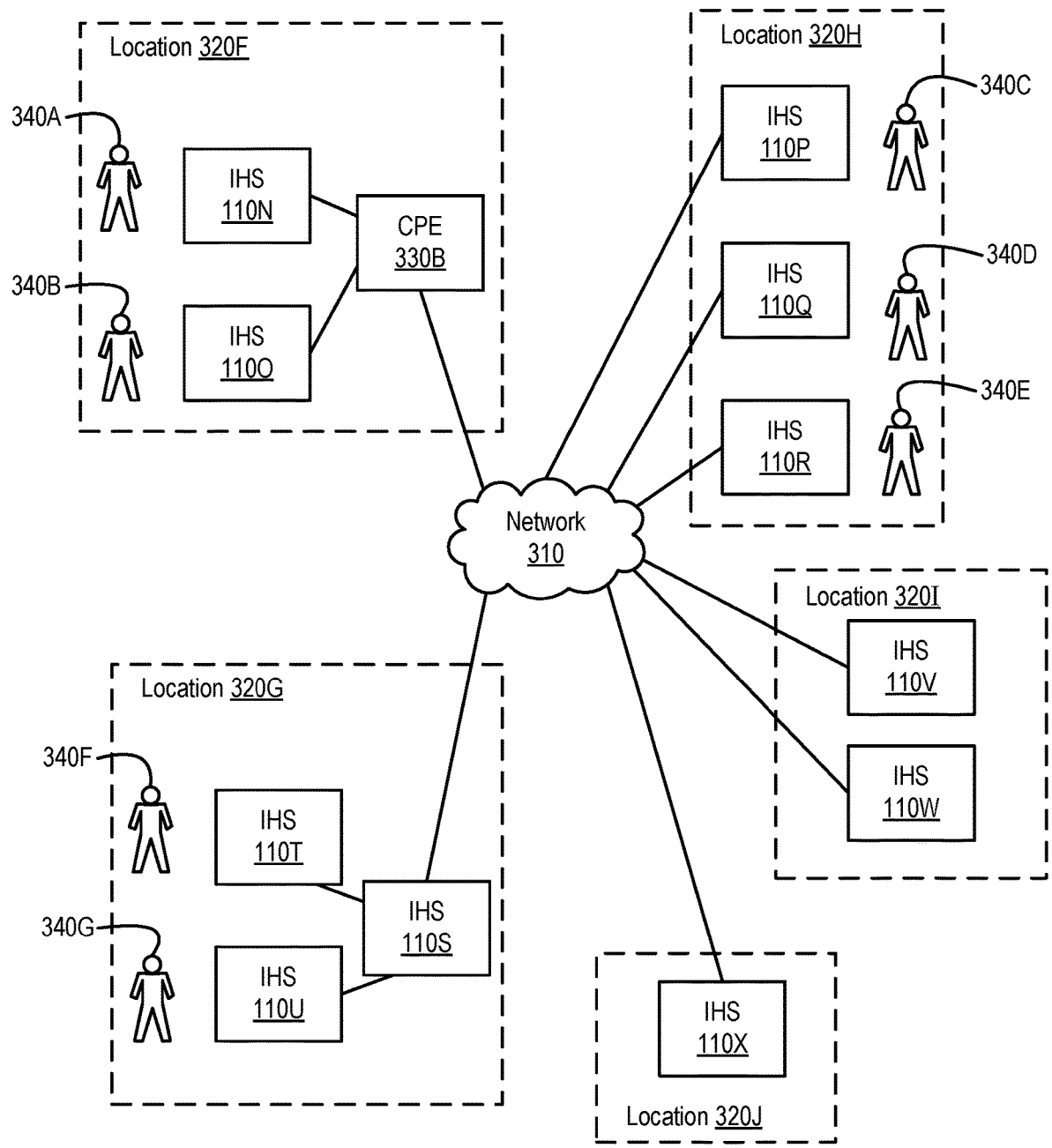

Turning now to FIGS. 3A and 3B, examples of information handling system coupled to a network are illustrated, according to one or more embodiments. As shown, CPE 330A-330C and 330F may be coupled to a network 310. In one or more embodiments, network 310 may include a wired network, a wireless network, an optical network, or a combination of the foregoing, among others. In one or more embodiments, network 310 may include and/or be coupled to various types of communications networks. For example, network 310 may include and/or be coupled to a LAN, a WAN, an Internet, a public switched telephone network (PSTN), a cellular telephone network, a satellite telephone network, or a combination of the foregoing, among others. In one or more embodiments, a WAN may include a private WAN, a corporate WAN, a public WAN, or a combination of the foregoing, among others. In one or more embodiments, CPE 330 may be or include one or more a network router, a modem (e.g., a cable television network modem), a network switch, a network address translator, and a firewall, among others.

As illustrated, CPE 330A may be located at a location 320A, CPE 330B may be located at a location 320B, CPE 330C-330E may be located at a location 320C, CPE 330F may be located at a location 320D, and CPE 330G-330I may be located at a location 320E. As shown, an IHS 110A may be coupled to CPE 320A and located at location 320A. As illustrated, information handling systems (IHSs) 110B and 110C may be coupled to CPE 320B and located at location 320B. As shown, IHSs 110D and 110E may be coupled to CPE 330D and may be located at location 320C. As illustrated, CPE 330D may be coupled to CPE 330C.

As shown, IHSs 110F-110H may be coupled to CPE 330E and may be located at location 320C. As illustrated, CPE 330E may be coupled to CPE 330C. As shown, IHSs 110H and 110I may be coupled to CPE 330F and may be located at location 320D. As illustrated, IHS 120J may be coupled to CPE 330H and may be located at location 320E. As shown, CPE 330H may be coupled to CPE 330G. As illustrated, CPE 330G may be coupled CPE 330F. As shown, IHSs 110K-110M may be coupled to CPE 330I and may be located at location 320E.

As illustrated, IHSs 110N and 110O may be coupled to CPE 330J. As shown, CPE 330J may be coupled to network 310. As illustrated, IHSs 110P-110S and 110V-110X may be coupled to network 310. As shown, IHSs 110N and 110O may be located at a location 320F. As illustrated, IHSs 110S-110U may be located at a location 320G. As shown, IHSs 110P-110R may be located at a location 320H. As illustrated, IHSs 110V and 110W may be located at a location 320I. As shown, IHS 110X may be located at a location 320J. As illustrated, IHSs 110T and 110U may be coupled to IHS 110S.

In one or more embodiments, a location 320 may be or include a physical location. For example, a location 320 may be or include a geographic location and/or a geographic region. In one or more embodiments, a location 320 may be or include a network location. For example, two locations 320 may include a single physical location, and IHSs 120 may be respective multiple different network locations. For instance, a first network location may be separated from a second network location by at least one CPE 330.

As shown, administrators 340A and 340B may be at location 320F. As illustrated, administrators 340C-340E may be at location 320H. As shown, administrators 340F and 340G may be at location 320G. In one or more embodiments, an administrator may utilize an IHS 110. In one example, administrator 340A may utilize IHS 110N. In a second example, administrator 340B may utilize IHS 110O. In a third example, administrator 340C may utilize IHS 110P. In a fourth example, administrator 340D may utilize IHS 110Q. In a fifth example, administrator 340E may utilize IHS 110R. In a sixth example, administrator 340F may utilize IHS 110T. In another example, administrator 340G may utilize IHS 110U.

In one or more embodiments, an administrator may utilize an associated information handling system to provide, via a network, a request to an intermediary information handling system to provide service to one or more information handling systems. For example, each of one or more of IHSs 110S, 110V, 110W, and 110X may be or include an intermediary information handling system. In one instance, administrator 340A may utilize IHS 110N to provide, via network 310, a request to intermediary IHS 110V to provide service to IHS 110B. In a second instance, administrator 340C may utilize IHS 110P to provide, via network 310, a request to intermediary IHS 110X to provide service to IHSs 110D-110H. In another instance, administrator 340F may utilize IHS 110T to provide, via network 310, a request to intermediary IHS 110S to provide service to IHS 110A.

In one or more embodiments, the intermediary information handling system may receive, via the network, one or more requests from one or more information handling systems, associated with respective one or more administrators, to access one or more baseboard management controllers (BMCs) of respective one or more information handling systems. In one example, intermediary IHS 110V may receive a request, via network 310, from IHS 110N to access BMC 185 of IHS 110B. In a second example, intermediary IHS 110X may receive a request, via network 310, from IHS 110P to access BMCs 185 of respective IHSs 110D-110H. In a third example, intermediary IHS 110S may receive a request, via network 310, from IHS 110T to access BMC 185 of IHS 110A. In another example, intermediary IHS 110S may receive a request, via network 310, from IHS 110T to access BMC 185 of IHS 110H.

In one or more embodiments, the intermediary information handling system may receive, via the network, authentication information from an information handling system associated with an administrator. In one example, intermediary IHS 110V may receive, via network 310, authentication information, via network 310, from IHS 110N. For instance, the authentication information may be associated with one or more of IHS 110N and administrator 340A, among others. In a second example, intermediary IHS 110X may receive authentication information, via network 310, from IHS 110P. For instance, the authentication information may be associated with one or more of IHS 110P and administrator 340C, among others. In another example, intermediary IHS 110S may receive authentication information, via network 310, from IHS 110T. For instance, the authentication information may be associated with one or more of IHS 110T and administrator 340F, among others. In one or more embodiments, the authentication information may include one or more of a user name, a password, a digital certificate, a two-factor identification code, a response to a challenge, a hardware token information, software token information, and a biometric identifier, among others.

In one or more embodiments, the intermediary information handling system may determine, based at least on the authentication information, that an information handling system is authenticated to access one or more baseboard management controllers. In one example, intermediary IHS 110V may determine, based at least on the authentication information from IHS 110N, that IHS 110N is authenticated to access BMC 185 of IHS 110B. In a second example, intermediary IHS 110X may determine, based at least on the authentication information from IHS 110P, that IHS 110P is authenticated to access BMCs 185 of respective IHSs 110D-110H. In a third example, IHS 110S may determine, based at least on the authentication information from IHS 110T, that IHS 110T is authenticated to access BMC 185 of IHS 110A. In another example, IHS 110S may determine, based at least on the authentication information from IHS 110T, that IHS 110T is authenticated to access BMC 185 of IHS 110H.

In one or more embodiments, the intermediary information handling system may establish, via the network, multiple network connections respectively associated with the baseboard management controllers. In one example, intermediary IHS 110V may establish, via the network, a network connection with BMC 185 of IHS 110B. In a second example, intermediary IHS 110X may establish, via the network, network connections with BMCs 185 of respective IHSs 110D-110H. For instance, intermediary IHS 110X may establish, via the network, a network connection with each of BMCs 185 of respective IHSs 110D-110H. In a third example, intermediary IHS 110S may establish, via the network, a network connection with BMC 185 of IHS 110A. In another example, intermediary IHS 110S may establish, via the network, a network connection with BMC 185 of IHS 110H.

In one or more embodiments, the intermediary information handling system may receive queries from the baseboard management controllers via the network connections. In one example, intermediary IHS 110V may receive a query from BMC 185 of IHS 110B via the network connection of intermediary IHS 110V and BMC 185 of IHS 110B. In a second example, intermediary IHS 110X may receive queries from BMCs 185 of respective IHSs 110D-110H via the network connections of IHS 110X and BMCs 185 of respective IHSs 110D-110H. For instance, intermediary IHS 110X may receive a query from each of BMCs 185 of respective IHSs 110D-110H. In a third example, intermediary IHS 110S may receive a query from BMC 185 of IHS 110B via the network connection of intermediary IHS 110V and BMC 185 of IHS 110A. In another example, intermediary IHS 110S may receive a query from BMC 185 of IHS 110H via the network connection of intermediary IHS 110V and BMC 185 of IHS 110H.

In one or more embodiments, receiving the queries from the baseboard management controllers via the network connections may include receiving the queries via a publish-subscribe-based messaging protocol. In one or more embodiments, a publish-subscribe-based messaging protocol may include message queuing telemetry transport (MQTT), Apache ActiveMQ, Amazon SQS, IBM Websphere MQ, RabbitMQ, or RocketMQ, among others. In one or more embodiments, receiving the queries from the baseboard management controllers via the network connections may include receiving MQTT messages, Apache ActiveMQ messages, Amazon SQS messages, IBM Websphere MQ messages, RabbitMQ messages, or RocketMQ messages, among others. For example, the baseboard management controllers may subscribe to one or more publications of one or more events. For instance, an event may include an information handling system associated with an administrator seeking network communications with one or more information handling systems.

In one or more embodiments, the intermediary information handling system may be or include a MQTT message broker, an Apache ActiveMQ, an Amazon SQS message broker, an IBM Websphere MQ message broker, a RabbitMQ message broker, and/or a RocketMQ message broker, among others. For example, the intermediary information handling system may be or include a MQTT publication and subscription server, an Apache ActiveMQ publication and subscription server, an Amazon SQS publication and subscription server, an IBM Websphere MQ publication and subscription server, a RabbitMQ publication and subscription server, and/or a RocketMQ publication and subscription server, among others. For instance, the intermediary information handling system may be or include message-oriented middleware.

In one or more embodiments, other message transport systems, methods, and/or processes may be utilized. In one example, a brokerless implementation may be utilized. For instance, the brokerless implementation may be or include ZeroMQ (ZMQ). In a second example, a remote procedure call (RPC) implementation may be utilized. For instance, the RPC implementation may be or include XML-RPC (extensible markup language RPC). In a third example, a hypertext transport protocol (HTTP) binary may be utilized. For instance, the HTTP binary may be or include gRPC (gRPC Remote Procedure Calls). In another example, a simple object access protocol (SOAP) may be utilized.

In one or more embodiments, the intermediary information handling system may determine, based at least on the requests, that the queries are associated with the requests. In one example, intermediary IHS 110V may determine, based at least on the request from IHS 110N, that the query of BMC 185 of IHS 110B is associated with the request from IHS 110N. In a second example, intermediary IHS 110X may determine, based at least on the request from IHS 110P, that the queries of BMCs 185 of respective IHSs 110D-110H are associated with the request from IHS 110P. For instance, intermediary IHS 110X may determine, based at least on the request from IHS 110P, that each of the queries of BMCs 185 of respective IHSs 110D-110H is associated with the request from IHS 110P. In a third example, intermediary IHS 110S may determine, based at least on the request from IHS 110T, that the query of BMC 185 of IHS 110A is associated with the request from IHS 110T. In another example, intermediary IHS 110S may determine, based at least on the request from IHS 110T, that the query of BMC 185 of IHS 110H is associated with the request from IHS 110T.

In one or more embodiments, the intermediary information handling system may provide, via the network, first information to the information handling system, associated with the administrator, to establish network communications with the baseboard management controllers. In one example, intermediary IHS 110V may provide, via network 310, first information to IHS 110N to establish network communications with BMC 185 of IHS 110B. In a second example, intermediary IHS 110X may provide, via network 310, first information to IHS 110P to establish network communications with BMCs 185 of respective IHSs 110D-110H. For instance, intermediary IHS 110X may provide, via network 310, the first information to IHS 110P to establish network communications with each of BMCs 185 of respective IHSs 110D-110H. In a third example, intermediary IHS 110S may provide, via network 310, first information to IHS 110T to establish network communications with BMC 185 of IHS 110A. In another example, intermediary IHS 110S may provide, via network 310, first information to IHS 110T to establish network communications with BMC 185 of IHS 110H.

In one or more embodiments, the intermediary information handling system may provide, via the network, second information to the baseboard management controllers to establish the network communications with the information handling system associated with the administrator. In one example, intermediary IHS 110V may provide, via network 310, second information to BMC 185 of IHS 110B to establish the network communications with IHS 110N. In a second example, intermediary IHS 110X may provide, via network 310, second information to BMCs 185 of respective IHSs 110D-110H to establish the network communications with IHS 110P. For instance, intermediary IHS 110X may provide, via network 310, second information to each of BMCs 185 of respective IHSs 110D-110H to establish the network communications with IHS 110P. In a third example, intermediary IHS 110S may provide, via network 310, second information to BMC 185 of IHS 110A to establish the network communications with IHS 110T. In another example, intermediary IHS 110S may provide, via network 310, second information to BMC 185 of IHS 110H to establish the network communications with IHS 110T.

In one or more embodiments, the second information may include an encryption key utilizable to secure the network communications. In one or more embodiments, the second information may include an indication of at least one tunneling protocol. For example, the at least one tunneling protocol may include at least one of an IP in IP (IPIP), a generic routing encapsulation (GRE), a secure socket tunneling protocol (SSTP), an Internet protocol security (IPSec), a layer 2 tunneling protocol (L2TP), a virtual extensible local area network (VXLAN), a virtual private network (VPN), a transport layer security (TLS), and a secure socket layer (SSL), a secure shell (SSH) tunnel protocol, and a port forwarding protocol, among others.

In one or more embodiments, the intermediary information handling system may receive, via the network, the indication of the at least one tunneling protocol from the information handling system associated with the administrator. In one or more embodiments, the intermediary information handling system may receive, via the network, at least one Internet protocol (IP) address associated with the information handling system associated with the administrator. For example, the second information may include the at least one IP address associated with the information handling system associated with the administrator.

In one or more embodiments, the intermediary information handling system may receive, via the network, data from each of the baseboard management controllers. For example, the intermediary information handling system may provide, via the network, the data from each of the baseboard management controllers to the information handling system associated with the administrator. In one or more embodiments, the intermediary information handling system may receive, via the network, first encrypted data from each of the baseboard management controllers. For example, the intermediary information handling system may produce data from each of the baseboard management controllers by decrypting the first encrypted data from each of the baseboard management controllers. For instance, producing the data from each of the baseboard management controllers by the decrypting the encrypted data from each of the baseboard management controllers may include utilizing encryption keys respectively associated with the baseboard management controllers.

In one or more embodiments, the intermediary information handling system may produce second encrypted data by encrypting the data from each of the baseboard management controllers. For example, the intermediary information handling system may provide, via the network, the second encrypted data to the information handling system associated with the administrator. In one or more embodiments, the intermediary information handling system may receive, via the network, encrypted data from the information handling system associated with the administrator. For example, the intermediary information handling system may provide, via the network, the encrypted data to the baseboard management controllers.

In one or more embodiments, the intermediary information handling system may permit a drive of the information handling system associated with the administrator to be mounted on a baseboard management controller and/or on an information handling system associated with the baseboard management controller. In one or more embodiments, the intermediary information handling system may permit a disk image of the information handling system associated with the administrator to be mounted on a baseboard management controller and/or on an information handling system associated with the baseboard management controller. For example, the disk image may be or include a file that includes contents and structure of a disk volume and/or of an entire data storage device. For instance, the data storage device may be or include at least one of a hard disk, a solid-state disk, tape drive, a floppy disk, an optical disc, and a USB flash drive, among others. In one or more embodiments, a file format of the disk image may be or include an open standard. For example, the disk image may be or include an ISO (International Organization for Standardization) image format for optical disk images. For instance, the disk image may be or include an ISO image. In one or more embodiments, the intermediary information handling system may permit the disk image to be mounted on the baseboard management controller and/or on the information handling system associated with the baseboard management controller as if the disk image was mounted locally.

Figure 4:
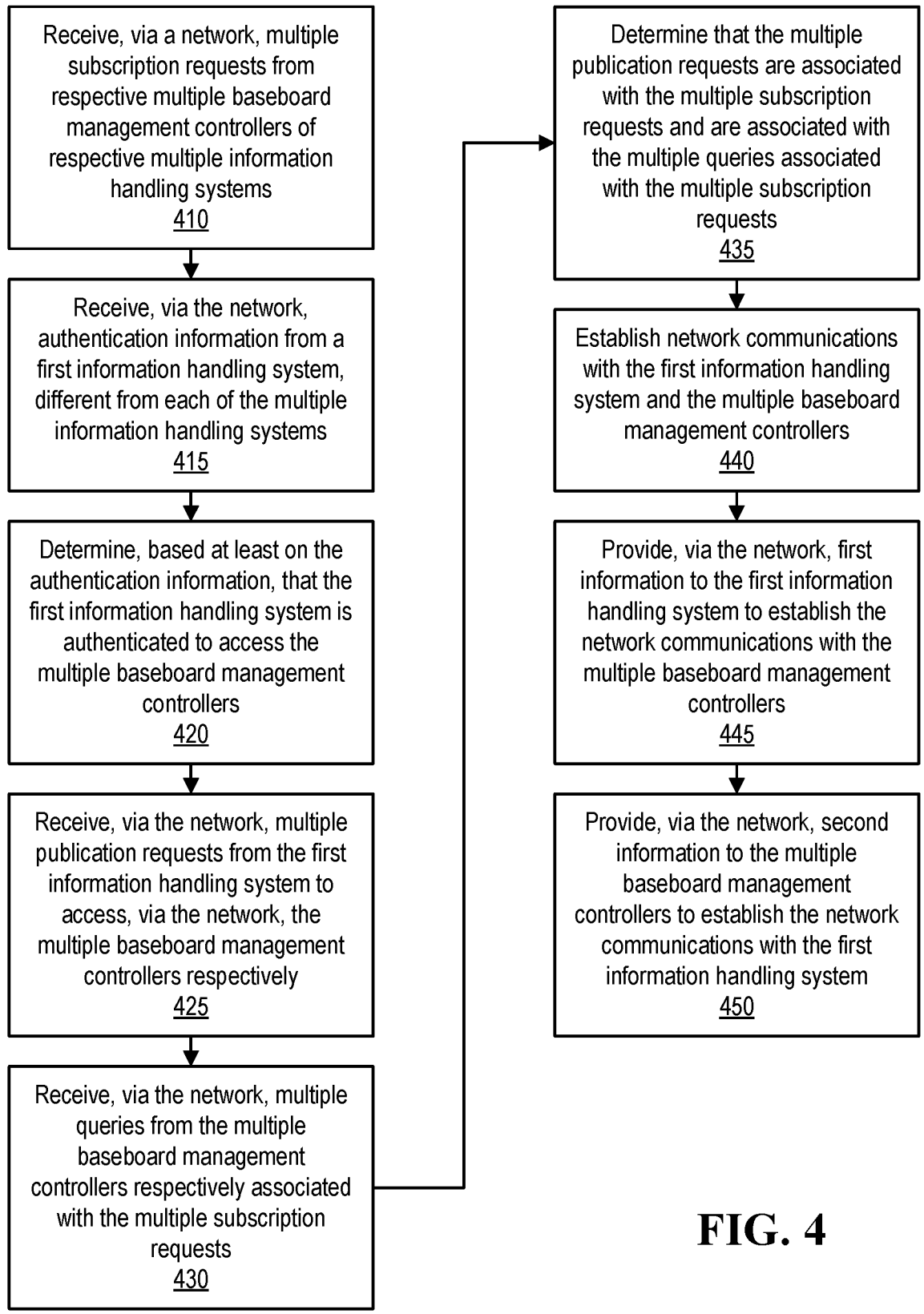
FIG. 4 illustrates an example of a method of operating an intermediary information handling system, according to one or more embodiments.

Turning now to FIG. 4, an example of a method of operating an intermediary information handling system is illustrated, according to one or more embodiments. At 410, multiple subscription requests from respective multiple baseboard management controllers of respective multiple information handling systems may be received via a network. In one or more embodiments, receiving, via the network, the multiple subscription requests may include receiving first multiple MQTT messages, Apache ActiveMQ messages, Amazon SQS messages, IBM Websphere MQ messages, RabbitMQ messages, or RocketMQ messages, among others. In one or more embodiments, receiving, via the network, the multiple subscription requests may include receiving the multiple subscription requests via one or more of an IP, a transmission control protocol (TCP), a User Datagram Protocol (UDP), a hypertext transfer protocol (HTTP), and a hypertext transfer protocol secure (HTTPS), among others.

At 415, authentication information may be received, via the network, from a first information handling system, different from each of the multiple information handling systems. In one or more embodiments, the first information handling system may be different from the intermediary information handling system. In one or more embodiments, the authentication information may include one or more of a user name, a password, a digital certificate, a two-factor identification code, a response to a challenge, a hardware token information, software token information, and a biometric identifier, among others. In one or more embodiments, receiving the authentication information may include receiving the authentication information via one or more of an IP, a TCP, a UDP, a HTTP, and a HTTPS, among others.

At 420, it may be determined, based at least on the authentication information, that the first information handling system is authenticated to access the multiple baseboard management controllers. At 425, multiple publication requests may be received, via the network from the first information handling system, to access the multiple baseboard management controllers respectively via the network. In one or more embodiments, receiving, via the network, the multiple publication requests may include receiving second multiple MQTT messages, Apache ActiveMQ messages, Amazon SQS messages, IBM Websphere MQ messages, RabbitMQ messages, or RocketMQ messages, among others. In one or more embodiments, receiving, via the network, the multiple publication requests may include receiving the multiple publication requests via one or more of an IP, a TCP, a UDP, a HTTP, and a HTTPS, among others.

At 430, multiple queries from the multiple baseboard management controllers respectively associated with the multiple subscription requests may be received via the network. In one or more embodiments, receiving, via the network, the multiple queries from the multiple baseboard management controllers respectively associated with the multiple subscription requests may include receiving third multiple MQTT messages, Apache ActiveMQ messages, Amazon SQS messages, IBM Websphere MQ messages, RabbitMQ messages, or RocketMQ messages, among others. In one or more embodiments, receiving, via the network, the multiple queries from the multiple baseboard management controllers respectively associated with the multiple subscription requests may include receiving the multiple queries via one or more of an IP, a TCP, a UDP, a HTTP, and a HTTPS, among others.

At 435, it may be determined that the multiple publication requests are associated with the multiple subscription requests and are associated with the multiple queries associated with the multiple subscription requests. At 440, network communications with the first information handling system and the multiple baseboard management controllers may be established. In one or more embodiments, establishing the network communications with the first information handling system and the multiple baseboard management controllers may be performed in response to determining that the multiple publication requests are associated with the multiple subscription requests and are associated with the multiple queries associated with the multiple subscription requests. In one or more embodiments, the network communications with the first information handling system and the multiple baseboard management controllers may include utilizing one or more of an IP, a TCP, a UDP, a HTTP, and a HTTPS, among others.

At 445, first information may be provided, via the network, to the first information handling system to establish the network communications with the multiple baseboard management controllers. In one or more embodiments, the first information may include an indication of at least one tunneling protocol. For example, the at least one tunneling protocol may include at least one of an IPIP, a GRE, a SSTP, an IPSec, a L2TP, a VXLAN, a VPN, a TLS, a SSL, a SSH tunnel protocol, and a port forwarding protocol, among others. In one or more embodiments, providing the first information to the first information handling system may include providing the first information to the first information handling system via one or more of an IP, a TCP, a UDP, a HTTP, and a HTTPS, among others.

At 450, second information may be provided, via the network, to the multiple baseboard management controllers to establish the network communications with the first information handling system. In one or more embodiments, the second information may include an indication of at least one tunneling protocol. For example, the at least one tunneling protocol may include at least one of an IPIP, a GRE, a SSTP, an IPSec, a L2TP, a VXLAN, a VPN, a TLS, a SSL, a SSH tunnel protocol, and a port forwarding protocol, among others. For instance, the indication of the at least one tunneling protocol may be received from the first information handling system. In one or more embodiments, providing the second information to the multiple baseboard management controllers may include providing the second information to the multiple baseboard management controllers via one or more of an IP, a TCP, a UDP, a HTTP, and a HTTPS, among others.

In one or more embodiments, at least one IP address associated with the first information handling system may be received. For example, the second information may include the at least one IP address. In one or more embodiments, establishing the network communications with the first information handling system and the multiple baseboard management controllers may be performed via providing, via the network, the first information to the first information handling system to establish the network communications with the multiple baseboard management controllers; and providing, via the network, the second information to the multiple baseboard management controllers to establish the network communications with the first information handling system.

In one or more embodiments, the intermediary information handling system may conduct at least a portion of the network communications with the first information handling system and the multiple baseboard management controllers. In one example, the intermediary information handling system may receive, via the network, first data from each of the multiple baseboard management controllers. In a second example, the intermediary information handling system may provide, via the network, the first data from each of the multiple baseboard management controllers to the first information handling system. In a third example, intermediary information handling system may receive, via the network, second data from the first information handling system. In another example, the intermediary information handling system may provide, via the network, the second data to at least one of the multiple baseboard management controllers. In one or more embodiments, the intermediary information handling system may perform as a router with the first information handling system and the multiple baseboard management controllers. In one or more embodiments, an intermediary information handling system may provide a VPN that communicatively couples the first information handling system with the multiple baseboard management controllers. In one example, the network communications may provide a separate communicative coupling between the first information handling system and each of the multiple baseboard management controllers. In another example, the network communications may provide a communicative coupling between or among any two or more of the first information handling system and the multiple baseboard management controllers. For instance, the communicative coupling between or among any two or more of the first information handling system and the multiple baseboard management controllers may perform as if the two or more of the first information handling system and the multiple baseboard management controllers were on the same network or the same local area network. In one or more embodiments, any data and/or information provided via network 310 may be provided via one or more of an IP, a TCP, a UDP, a HTTP, and a HTTPS, among others. In one or more embodiments, any data and/or information received via network 310 may be received via one or more of an IP, a TCP, a UDP, a HTTP, and a HTTPS, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
  receive, via a network, a plurality of subscription requests from a respective plurality of baseboard management controllers of a respective plurality of information handling systems;
  receive, via the network, authentication information from a first information handling system, different from each of the plurality of information handling systems;
  determine, based at least on the authentication information, that the first information handling system is authenticated to access the plurality of baseboard management controllers;
  receive, via the network, a plurality of publication requests from the first information handling system to access, via the network, the plurality of baseboard management controllers respectively;
  receive, via the network, a plurality of queries from the plurality of baseboard management controllers respectively associated with the plurality of subscription requests;
  determine that the plurality of publication requests are associated with the plurality of subscription requests and are associated with the plurality of queries associated with the plurality of subscription requests; and
  in response to determining that the plurality of publication requests are associated with the plurality of subscription requests and are associated with the plurality of queries associated with the plurality of subscription requests, establish network communications with the first information handling system and the plurality of baseboard management controllers, wherein, to establish the network communications, the instructions further cause the information handling system to:

provide, via the network, first information to the first information handling system to establish the network communications with the plurality of baseboard management controllers; and provide, via the network, second information to the plurality of baseboard management controllers to establish the network communications with the first information handling system.

2. The information handling system of claim 1, wherein the second information includes an indication of at least one tunneling protocol.

3. The information handling system of claim 2, wherein the at least one tunneling protocol includes at least one of an IP in IP (IPIP), a generic routing encapsulation (GRE), a secure socket tunneling protocol (SSTP), an Internet protocol security (IPSec), a layer 2 tunneling protocol (L2TP), a virtual extensible local area network (VXLAN), a virtual private network (VPN), a transport layer security (TLS), a secure socket layer (SSL), a secure shell (SSH) tunnel protocol, and a port forwarding protocol.

4. The information handling system of claim 2, wherein the instructions further cause the information handling system to:
receive, via the network, the indication of the at least one tunneling protocol from the first information handling system.

5. The information handling system of claim 1,
wherein, to receive, via the network, the plurality of subscription requests, the instructions further cause the information handling system to receive a first plurality of message queuing telemetry transport (MQTT) messages, Apache ActiveMQ messages, Amazon SQS messages, IBM Websphere MQ messages, RabbitMQ messages, or RocketMQ messages;
wherein, to receive, via the network, the plurality of publication requests, the instructions further cause the information handling system to receive a second plurality of MQTT messages, Apache ActiveMQ messages, Amazon SQS messages, IBM Websphere MQ messages, RabbitMQ messages, or RocketMQ messages; and
wherein, to receive, via the network, the plurality of queries from the plurality of baseboard management controllers respectively associated with the plurality of subscription requests, the instructions further cause the information handling system to receive a third plurality of MQTT messages, Apache ActiveMQ messages, Amazon SQS messages, IBM Websphere MQ messages, RabbitMQ messages, or RocketMQ messages.

6. The information handling system of claim 1, wherein the instructions further cause the information handling system to:
receive, via the network, at least one Internet protocol (IP) address associated with the first information handling system;
wherein the second information include the at least one IP address.

7. The information handling system of claim 1, wherein the instructions further cause the information handling system to:
receive, via the network, first data from each of the plurality of baseboard management controllers;
provide, via the network, the first data from each of the plurality of baseboard management controllers to the first information handling system;
receive, via the network, second data from the first information handling system; and provide, via the network, the second data to at least one of the plurality of baseboard management controllers.

8. A method, comprising:
receiving, via a network, a plurality of subscription requests from a respective plurality of baseboard management controllers of a respective plurality of information handling systems;
receiving, via the network, authentication information from a first information handling system, different from each of the plurality of information handling systems;
determining, based at least on the authentication information, that the first information handling system is authenticated to access the plurality of baseboard management controllers;
receiving, via the network, a plurality of publication requests from the first information handling system to access, via the network, the plurality of baseboard management controllers respectively;
receiving, via the network, a plurality of queries from the plurality of baseboard management controllers respectively associated with the plurality of subscription requests;
determining that the plurality of publication requests are associated with the plurality of subscription requests and are associated with the plurality of queries associated with the plurality of subscription requests; and
in response to the determining that the plurality of publication requests are associated with the plurality of subscription requests and are associated with the plurality of queries associated with the plurality of subscription requests, establishing network communications with the first information handling system and the plurality of baseboard management controllers via:
providing, via the network, first information to the first information handling system to establish the network communications with the plurality of baseboard management controllers; and
providing, via the network, second information to the plurality of baseboard management controllers to establish the network communications with the first information handling system.

9. The method of claim 8, wherein the second information includes an indication of at least one tunneling protocol.

10. The method of claim 9, wherein the at least one tunneling protocol includes at least one of an IP in IP (IPIP), a generic routing encapsulation (GRE), a secure socket tunneling protocol (SSTP), an Internet protocol security (IPSec), a layer 2 tunneling protocol (L2TP), a virtual extensible local area network (VXLAN), a virtual private network (VPN), a transport layer security (TLS), a secure socket layer (SSL), a secure shell (SSH) tunnel protocol, and a port forwarding protocol.

11. The method of claim 9, further comprising:
receiving, via the network, the indication of the at least one tunneling protocol from the first information handling system.

12. The method of claim 8,
wherein the receiving, via the network, the plurality of subscription requests includes receiving a first plurality of message queuing telemetry transport (MQTT) messages, Apache ActiveMQ messages, Amazon SQS messages, IBM Websphere MQ messages, RabbitMQ messages, or RocketMQ messages;
wherein the receiving, via the network, the plurality of publication requests includes receiving a second plurality of MQTT messages, Apache ActiveMQ messages, Amazon SQS messages, IBM Websphere MQ messages, RabbitMQ messages, or RocketMQ messages; and wherein the receiving, via the network, the plurality of queries from the plurality of baseboard management controllers respectively associated with the plurality of subscription requests includes receiving a third plurality of MQTT messages, Apache ActiveMQ messages, Amazon SQS messages, IBM Websphere MQ messages, RabbitMQ messages, or RocketMQ messages.

13. The method of claim 8, further comprising:
receiving, via the network, at least one Internet protocol (IP) address associated with the first information handling system;
wherein the second information include the at least one IP address.

14. The method of claim 8, further comprising:
receiving, via the network, first data from each of the plurality of baseboard management controllers;
providing, via the network, the first data from each of the plurality of baseboard management controllers to the first information handling system;
receiving, via the network, second data from the first information handling system; and
providing, via the network, the second data to at least one of the plurality of baseboard management controllers.

15. A computer-readable non-transitory memory medium that includes instructions that, when executed by at least one processor of an information handling system, cause the information handling system to:
receive, via a network, a plurality of subscription requests from a respective plurality of baseboard management controllers of a respective plurality of information handling systems;
receive, via the network, authentication information from a first information handling system, different from each of the plurality of information handling systems;
determine, based at least on the authentication information, that the first information handling system is authenticated to access the plurality of baseboard management controllers;
receive, via the network, a plurality of publication requests from the first information handling system to access, via the network, the plurality of baseboard management controllers respectively;
receive, via the network, a plurality of queries from the plurality of baseboard management controllers respectively associated with the plurality of subscription requests;
determine that the plurality of publication requests are associated with the plurality of subscription requests and are associated with the plurality of queries associated with the plurality of subscription requests; and
in response to determining that the plurality of publication requests are associated with the plurality of subscription requests and are associated with the plurality of queries associated with the plurality of subscription requests, establish network communications with the first information handling system and the plurality of baseboard management controllers, wherein, to establish the network communications, the instructions further cause the information handling system to:

provide, via the network, first information to the first information handling system to establish the network communications with the plurality of baseboard management controllers; and
provide, via the network, second information to the plurality of baseboard management controllers to establish the network communications with the first information handling system.

16. The computer-readable non-transitory memory medium of claim 15, wherein the second information includes an indication of at least one tunneling protocol.

17. The computer-readable non-transitory memory medium of claim 16, wherein the at least one tunneling protocol includes at least one of an IP in IP (IPIP), a generic routing encapsulation (GRE), a secure socket tunneling protocol (SSTP), an Internet protocol security (IPSec), a layer 2 tunneling protocol (L2TP), a virtual extensible local area network (VXLAN), a virtual private network (VPN), a transport layer security (TLS), a secure socket layer (SSL), a secure shell (SSH) tunnel protocol, and a port forwarding protocol.

18. The computer-readable non-transitory memory medium of claim 16, wherein the instructions further cause the information handling system to:
receive, via the network, the indication of the at least one tunneling protocol from the first information handling system.

19. The computer-readable non-transitory memory medium of claim 15,
wherein, to receive, via the network, the plurality of subscription requests, the instructions further cause the information handling system to receive a first plurality of message queuing telemetry transport (MQTT) messages, Apache ActiveMQ messages, Amazon SQS messages, IBM Websphere MQ messages, RabbitMQ messages, or RocketMQ messages;
wherein, to receive, via the network, the plurality of publication requests, the instructions further cause the information handling system to receive a second plurality of MQTT messages, Apache ActiveMQ messages, Amazon SQS messages, IBM Websphere MQ messages, RabbitMQ messages, or RocketMQ messages; and
wherein, to receive, via the network, the plurality of queries from the plurality of baseboard management controllers respectively associated with the plurality of subscription requests, the instructions further cause the information handling system to receive a third plurality of MQTT messages, Apache ActiveMQ messages, Amazon SQS messages, IBM Websphere MQ messages, RabbitMQ messages, or RocketMQ messages.

20. The computer-readable non-transitory memory medium of claim 15, wherein the instructions further cause the information handling system to:
receive, via the network, at least one Internet protocol (IP) address associated with the first information handling system;
wherein the second information include the at least one IP address.

* * * * *